United States Patent Office 2,893,835

Patented July 7, 1959

1

2,893,835

PROCESS FOR PREPARING THIOCARBONATES

Bobbie D. Stone, Miamisburg, and Morris L. Nielsen, Centerville, Ohio, assignors to Monsanto Chemical Company, St. Louis, Mo., a corporation of Delaware No Drawing. Application March 17, 1955
Serial No. 495,064

9 Claims. (Cl. 23—114)

This invention relates to a process for the preparation of thiocarbonates.

The alkali trithiocarbonates, of the formula $$M-S-\overset{\overset{S}{\|}}{C}-S-M$$

and tetrathioperoxycarbonates of the formula $$M_2CS_4$$

where M is a monovalent inorganic cation, are well-known, stable, useful compounds. They are useful, for example, as rubber additives, as waterproofing agents for protein, etc. However, hitherto no satisfactory method has been known for the preparation of these compounds. It is the object of this invention to provide a new, efficient method for the preparation of ammonium, alkali and alkaline earth metal salts of trithiocarbonic and tetrathioperoxycarbonic acids.

The preparation of alkali trithiocarbonates can be represented theoretically by the simple reaction schemes $$Na_2S+CS_2\rightarrow NA_2CS_3$$

$$2NaHS+CS_2\rightarrow Na_2CS_3+H_2S\uparrow$$

In the absence of added solvent, these reactions proceed only slowly. Carrying out the reactions in aqueous solution is undesirable because of the problem of isolating the product. The trithiocarbonates are highly water-soluble, hygroscopic, and sometimes deliquescent, and they are, furthermore, sensitive to higher temperatures so that they decompose on evaporation of an aqueous solution to dryness. Using anhydrous ethanol and metallic sodium, the trithiocarbonates have been prepared by the following sequence of reactions:

$$EtOH+Na\rightarrow NaOEt+\tfrac{1}{2}H_2$$

$$NaOEt+H_2S\rightarrow NaHS+EtOH$$

$$2NaHS+CS_2\rightarrow Na_2CS_3+H_2S$$

However, the trithiocarbonates are also quite soluble in alcohol; to separate the product from solution, it is necessary to treat the reaction mixture with a displacing agent, such as ether, in which case the trithiocarbonates frequently separate, not as solids, but as difficultly crystallizable oils. This laboratory procedure, using large amounts of expensive reagents, and requiring extra steps for the separation and crystallization of the products, is not feasible for the synthesis of the present compounds on a commercial scale. Thus, no economic method for the preparation of trithiocarbonates has hitherto been available in the art.

The tetrathioperoxycarbonates, of the formula $$M_2CS_4$$

where M represents a monovalent cation of ammonium, an alkali metal, or an alkaline earth metal, are prepared by the reaction of a mixture of sulfur and the inorganic sulfide with carbon disulfide:

$$S+Na_2S+CS_2\rightarrow Na_2CS_4$$

2

This reaction can be carried out by procedures analogous to those used for the preparation of the trithiocarbonates, but the difficulties of synthesis are aggravated here by the much greater solubilities of the product thiocarbonates in water and alcohol, greater tendencies towards the formation of oils rather than crystals and more pronounced thermal instability.

It is an object of this invention to provide an improved method for the preparation of thithiocarbonate and tetrathioperoxycarbonate salts of ammonium, alkali metals and alkaline earth metals.

It is a further object of this invention to provide a method whereby the presence of large quantities of water is avoided in such preparations.

It is a further object of this invention to provide a method whereby the use of large quantities of expensive oxygenated solvents for carrying out the reaction of carbon disulfide with the sulfides and hydrosulfides of ammonium, alkali metals and alkaline earth metals is avoided.

It is a further object of this invention to provide a method whereby the trithiocarbonates and tetrathioperoxycarbonates of ammonium, alkali metals, and alkaline earth metals are prepared in media wherein said compounds are substantially insoluble.

These and other objects of the invention are readily accomplished by carrying out the reaction of carbon disulfide with ammonium, alkali metal, and alkaline earth metal sulfides and hydrosulfides in a solvent-nonsolvent system.

We have discovered that carbon disulfide will react rapidly with the sulfides and hydrosulfides of ammonium, alkali metals, and alkaline earth metals in a medium which is composed in major part of a nonsolvent for the reaction components, and which contains only a minor proportion, less than sufficient to dissolve the inorganic sulfide, say, 3 to 30 percent, and preferably about 10 percent, of a liquid material which is miscible with said nonsolvent and which is a solvent, to a measurable degree, for the inorganic sulfides. We have further discovered that, when carbon disulfide is reacted with an ammonium, alkali metal, or alkaline earth metal sulfide or hydrosulfide in a solvent-nonsolvent medium of this nature, the product trithiocarbonates or tetrathioperoxycarbonates precipitate readily and spontaneously to a substantially complete degree. We have thus provided a new and readily operable procedure whereby the ammonium, alkali metal and alkaline earth metal trithiocarbonates and tetrathioperoxycarbonates may conveniently be prepared, while avoiding the difficulties entailed by previous procedures, of using large amounts of expensive solvent and of the complications attendant on isolation of the products.

As nonsolvents for our process, we may use any readily available inert organic diluent. We prefer to use liquids with boiling points in the range of from 30 to 100° C., preferably 50 to 80° C., so as to facilitate the drying of the products, but if desired, high-boiling solvents, such as turpentine and kerosene, may be used as diluents, in which case the products may be freed of residual diluent mechanically retained on the crystals by extraction, for example. As examples of preferred nonsolvent diluents characterized by suitable boiling points may be mentioned, e.g., aliphatic paraffins such as hexane and pentane, cycloaliphatics such as cyclohexane and petroleum naphthenes, aromatic compounds such as benzene and toluene, halogenated liquids such as carbon tetrachloride, chloroform, and ethylene dichloride, etc.

Liquids suitable for the solvent portion of the solvent-non-solvent reaction medium are organic solvents characterized by miscibility with the nonsolvent diluent portion of the medium, and by a measurable solvency for the inorganic sulfide being reacted. We have found that the organic solvents which possess the desired solvency power for inorganic sulfides are those generally described as "levelling solvents." In the classification of solvents on the basis of the behavior of typical electrolytes in them, levelling solvents are those in which the reference electrolytes are equally strongly dissociated, as shown by conductance data, and differentiating solvents are those in which different reference electrolytes are dissociated to different degrees (Audrieth and Kleinberg, "Non-Aqueous Solvents," Wiley, 1953, p. 15). Thus, whereas acetonitrile and methyl ethyl ketone are differentiating solvents, methanol and ethanol are levelling solvents. Thus, we have found, for example, that acetone and furan, which are differentiating solvents, are not useful solvents in the practice of this invention. On the other hand, dioxane, an ether closely related to furan, in mixture with hexane, provides a medium in which the reaction of sodium sulfide and carbon disulfide proceeds easily. Preferred solvents for the process of the invention are, for example, methanol, ethanol, isopropanol, dioxane, dimethylformamide, etc.

In carrying out the process of the invention, we use a mixture containing from 3 to 30 percent, and preferably about 10 percent, of the levelling solvent as described above, the remainder of the reaction medium being inert organic liquid diluent. The volume of liquid reaction medium used may be any convenient amount above the minimum quantity necessary to produce a stirrable slurry on addition of the reactants. The carbon disulfide, the inorganic sulfide, and the sulfur, in the preparation of tetrathioperoxycarbonates, may be contacted in any order in the reaction medium. Usually, since the reaction is a simple stoichiometric addition, the reactants are added in approximately equimolecular amounts; if desired, however, a slight excess of one of the reactants, e.g., carbon disulfide, may be used in order to drive the reaction further towards completion. The reaction of forming the thiocarbonates is exothermic, and usually the reactants may be simply contacted at room temperature and agitated to produce the product without further heating than that provided by the heat of reaction. If desired, however, the reaction mixture may be gently heated to accelerate the reaction. Generally, the reaction goes readily at atmospheric pressure; if desired, superatmospheric pressures may be applied, for example, to facilitate the use of higher temperatures, or when a more volatile diluent, such as butane, is used. Superatmospheric pressures may also be used, for example, when gaseous ammonia is to be used as one of the reactants.

Inorganic sulfides which may be used to prepare the compounds of the invention include the sulfides and hydrosulfides of ammonium, the alkali metals, and the alkaline earth metals. Sodium trithiocarbonate, for example, may be prepared by reaction of sodium sulfide and carbon disulfide; if desired, the sodium sulfide may be prepared in situ by reaction of sodium hydrosulfide (NaHS) and an alkali. Sodium tetrathioperoxycarbonate is prepared by reaction of carbon disulfide with sodium disulfide; the sodium disulfide may be ready-prepared, or simply a mixture of carbon disulfide, sulfur and sodium sulfide may be contacted to produce the tetrathioperoxycarbonate. Potassium and lithium trithiocarbonates and tetrathioperoxycarbonates are produced similarly, from the sulfides of these compounds. To prepare the ammonium thiocarbonates, ammonium sulfide or ammonium pentasulfide may be reacted with the carbon disulfide; alternatively, the ammonium sulfide may be prepared in the reaction medium by bubbling ammonia and hydrogen sulfide through it.

The alkaline earth thiocarbonates are prepared like the alkali metal thiocarbonates; by this method may be prepared, for example, calcium trithiocarbonate, calcium tetrathioperoxycarbonate, barium trithiocarbonate, barium tetrathioperoxycarbonate, magnesium trithiocarbonate, magnesium tetrathioperoxycarbonate, strontium trithiocarbonate, strontium tetrathioperoxycarbonate, etc.

Examples of reaction media suitable for use in the process of the invention are, e.g., 10% ethanol—90% hexane, 10% methanol—90% hexane, 10% isopropanol—90% hexane, 15% ethanol—85% benzene, 20% ethanol—80% pentane, 30% dioxane—70% cyclohexane, 20% ethanol—80% hexane, etc. It is not necessary that the solvents used in preparing the reaction media be anhydrous; thus, for example, the usual 95–5 commercial azeotrope of ethanol and water may readily be used in preparing the solvent-nonsolvent mixture.

PREPARATION OF SODIUM TRITHIOCARBONATE

*Example 1*

REACTION WITHOUT SOLVENT

Nitrogen gas saturated with carbon disulfide was passed through a flask containing fifty g. of vigorously stirred technical sodium sulfide for one hour. At the end of this time, the powder had gained no weight, and no sodium trithiocarbonate could be detected in the flask contents.

In a further attempt to react sodium sulfide with carbon disulfide directly, without solvent, 50 g. of technical sodium sulfide were placed in a flask provided with stirrer and condenser and 51 ml. of liquid $CS_2$ (2.2 moles of carbon disulfide per mole of sodium sulfide) were added. The mixture was stirred for 7.5 hours; during this time the temperature rose from 25° C. up to 26° C. at the beginning of the stirring period, and did not rise thereafter. The reaction mixture was filtered and the solids washed with hexane and dried under vacuum at 35° C. After drying, this material weighed 44.7 g. Analysis indicated that the sample contained 0.68 percent carbon, which indicated that less than 10 percent of the sodium sulfide was converted to sodium trithiocarbonate by this procedure.

*Example 2*

REACTION IN HEXANE

A suspension of 50 g. of powdered technical sodium sulfide in 200 ml. of hexane was vigorously stirred while 40 ml. of carbon disulfide was added slowly from a dropping funnel. Stirring was continued for another two hours, during which time the temperature of the mixture rose from 21° to 29° C. The yellowish solid in the mixture was filtered off, washed with hexane, dried and analyzed; it contained 0.41 percent C. Thus, less than 5 percent of the sodium sulfide was converted to sodium trithiocarbonate after two hours reaction in hexane.

The above experiment was repeated, stirring together 50 g. of technical sodium sulfide, 25.5 ml. of carbon disulfide and 200 ml. of hexane for six hours, at 25° C. The product analyzed 0.58 percent carbon, i.e., less than 10 percent of the sodium sulfide had been converted to trithiocarbonate.

*Example 3*

REACTION IN 10% ETHANOL AND 90% HEXANE

Four hundred grams of powdered technical sodium sulfide were charged to a 5-liter flask fitted with dropping funnel, thermometer and stirrer. Five hundred milliliters of a mixture of 93 ml. of 2B-grade ethanol and one liter of n-hexane were added to the sodium sulfide, and the mixture was stirred vigorously while 200 ml. of carbon disulfide were added from the dropping funnel in a slow stream. While stirring was continued, the remainder of the alcohol-hexane mixture was added in 200 ml. increments until all of the 1093 ml. had been added, and the mixture was then stirred for a further 85 minutes, during which time the temperautre rose to a maximum of 37° C. After this, the solids in the slurry were collected by filtration on a Büchner funnel. After washing with hexane and drying in vacuum at 35° C., the product weighed 595 g. and analyzed as follows:

| | Found | Calculated for $Na_2CS_3.3H_2O$ |
|---|---|---|
| Percent C | 6.77 | 5.77 |
| Percent S | 45.09 | 46.15 |
| Percent $H_2O$ | 30.6 | 25.9 |

This sample was then analyzed for free sulfur by carbon disulfide extraction in a Soxhlet thimble. The weight of solid left after evaporation of the carbon disulfide to dryness indicates that the trithiocarbonate contained 0.114 percent extractable sulfur.

PREPARATION OF SODIUM TETRATHIOPEROXYCARBONATE

*Example 4*

REACTION IN ETHANOL

To a mixture of 400 g. of powdered technical sodium sulfide and 110 g. of sulfur were added 2 liters of ethanol. Yellow sodium disulfide separated. Then 260 g. of carbon disulfide were added to the mixture. On stirring, nearly all the solids present went into solution, and no further precipitate appeared. The mixture was filtered and the solids discarded. On mixing the filtrate with an equal volume of benzene, an oil separated; on standing for 3 days, this oil solidified with crusting. The total yield from the reaction was 544 g., or 73 percent of theory.

*Example 5*

COMPARISON OF HEXANE AND HEXANE-ALCOHOL MIXTURE

To two identical flasks, 40 ml. (53 g.) carbon disulfide and 200 ml. hexane were charged. To one flask was added 20 ml. ethanol. Over a period of 21 minutes, a mixture of 50 g. of technical sodium sulfide and 12.5 g. sulfur was added to each flask in equivalent increments, while stirring the contents. The temperature rises in the flasks are shown below:

| Time (Min.) | Temp., °C., Hexane alone | Temp., °C., Hexane-alcohol |
|---|---|---|
| 0 | 20 | 22 |
| 5 | 21 | 25 |
| 9 | 24 | 31 |
| 12 | 26 | 40 |
| 21 | 29 | 45 |

The reaction mixtures were then immediately filtered, the solids washed with hexane, dried at 35° C. in vacuum, and analyzed:

| | Found, Hexane alone | Found, Hexane-alcohol | Calcd. for $Na_2CS_4.3H_2O$ |
|---|---|---|---|
| Percent C | 2.48 | 5.37 | 5.00 |
| Percent S | 46.22 | 54.23 | 53.4 |
| S/C ratio | 6.96 | 3.8 | 4.00 |
| Percent $H_2O$ | 31.1 | 23.8 | 22.5 |

Thus, in the same length of time, reaction in the alcohol-hexane mixture was substantially complete, whereas in hexane alone, only about 40 percent of the sodium disulfide had reacted.

*Example 6*

REACTION IN HEXANE-ALCOHOL MIXTURE

A solution of 40 ml. (50 g.) of carbon disulfide in 100 ml. of hexane and 10 ml. of ethanol was placed in a 500 ml. 4-necked flask equipped with condenser, stirrer, thermometer and funnel. A mixture of 50 g. technical sodium sulfide and 12.5 g. sulfur in 100 ml. hexane and 10 ml. ethanol was added in small portions through the funnel to the vigorously stirred mixture. Rapid separation of an orange solid with no oily properties was observed. Stirring was continued for one hour after addition of the reactants had been completed. The solids were then filtered off, washed with hexane, and dried in vacuum at 35° C. The sample analyzed as follows:

| | Found | Calculated for $Na_2CS_4.3H_2O$ |
|---|---|---|
| Percent C | 5.97 | 5.00 |
| Percent S | 54.42 | 53.4 |
| Percent $H_2O$ | 24.2 | 22.5 |

The above product was also submitted to testing for the presence of free sulfur, by extraction with carbon disulfide in a Soxhlet apparatus. The weight of the solids left after evaporation of this carbon disulfide to dryness indicates that the sample contained only 0.17 percent free sulfur.

*Example 7*

This example shows a different order of addition of reactants, in the alcohol-hexane mixture.

A flask placed in a water bath was charged with 2 liters of hexane, 200 ml. of ethanol, 400 ml. of carbon disulfide and 125 g. of sulfur. The flask was cooled while 500 g. of sodium sulfide were added to it in small increments over 15 minutes; the temperature rose from 13.5° to 24° C. during this time. Stirring and cooling were continued for 25 minutes; the temperature dropped to 20.5° C. The flask was then heated and the contents stirred for an hour and a half while the temperature was gradually raised to a maximum of 36° C. The reaction mixture was filtered and dried; yield, 878 g., or better than 90 percent of theory. The dried product, even without washing, was a free-flowing granular material containing little or no free sulfur.

What is claimed is:

1. The method of preparing thiocarbonates which comprises reacting carbon disulfide with an inorganic sulfide of a member of the group consisting of ammonium, alkali metals, and alkaline earth metals, in a liquid medium comprising from 97 to 70 percent by weight of an inert organic liquid diluent selected from the group consisting of aliphatic paraffin, cycloparaffin, aromatic and halogenated aliphatic hydrocarbons having boiling points in the range of 30 to 100° C., and from 3 to 30 percent by weight of levelling solvent selected from the group consisting of methanol, ethanol, isopropanol, dioxane and dimethylformamide, said levelling solvent being characterized by a measurable solvency for said inorganic sulfide and being further characterized by a substantial miscibility with said inert organic liquid diluent.

2. The method of claim 1, in which said levelling solvent is ethanol.

3. The method of claim 1, in which said inert diluent is hexane.

4. The method of preparing a trithiocarbonate salt of a cation selected from the group consisting of ammonium, alkali metals, and alkaline earth metals, which comprises reacting carbon disulfide with a sulfide of said cation in a liquid medium comprising from 97 to 70 percent by weight of an organic, liquid, inert diluent selected from the group consisting of aliphatic paraffin, cycloparaffin, aromatic and halogenated aliphatic hydrocarbons having boiling points in the range of 30 to 100° C., and from 3 to 30 percent by weight of liquid, levelling solvent selected from the group consisting of methanol, ethanol, isopropanol, dioxane and dimethylformamide, said levelling solvent being characterized by a measurable solvency for said inorganic sulfide and being further characterized by a substantial miscibility with said inert organic diluent.

5. The method of preparing a tetrathioperoxycarbonate salt of a cation selected from the group consisting of ammonium, alkali metals, and alkaline earth metals, which comprises reacting carbon disulfide with a mixture of sulfur and a sulfide of said cation in a liquid medium comprising from 97 to 70 percent by weight of an inert organic liquid diluent selected from the group consisting of aliphatic paraffin, cycloparaffin, aromatic and halogenated aliphatic hydrocarbons having boiling points in the range of 30 to 100° C., and from 3 to 30 percent by weight of liquid levelling solvent selected from the group consisting of methanol, ethanol, isopropanol, dioxane and dimethylformamide, said solvent being characterized by a measurable solvency for said inorganic sulfide and being further characterized by a substantial miscibility with said inert organic diluent.

6. The method of preparing sodium trithiocarbonate which comprises reacting carbon disulfide with sodium sulfide in a liquid medium comprising a mixture of from 97 to 70 percent by weight of hexane and from 3 to 30 percent by weight of a lower alkyl alcohol.

7. The method of preparing sodium trithiocarbonate which comprises reacting carbon disulfide with sodium sulfide in a liquid medium comprising a mixture of from 97 to 70 percent by weight of hexane and from 3 to 30 percent by weight of ethanol.

8. The method of preparing sodium tetrathioperoxycarbonate which comprises reacting carbon disulfide with a mixture of sodium sulfide and sulfur in a liquid medium comprising a mixture of from 97 to 70 percent by weight of hexane and from 3 to 30 percent by weight of a lower alkyl alcohol.

9. The method of preparing sodium tetrathioperoxycarbonate which comprises reacting carbon disulfide with a mixture of sodium sulfide and sulfur in a liquid medium comprising a mixture of from 97 to 70 percent by weight of hexane and from 3 to 30 percent by weight of ethanol.

References Cited in the file of this patent

"Comprehensive Treatise on Inorganic and Theoretical Chemistry," Mellor, Longmans, Green and Co. (London), 1925, vol. 6, page 121.

Yeoman: "Journal of the Chemical Society," vol. 119, page 51 (1921).